UNITED STATES PATENT OFFICE.

H. P. GENGEMBRE, OF ALLEGHENY CITY, PENNSYLVANIA.

IMPROVED CEMENT OF BOILED COAL-TAR AND EARTHS.

Specification forming part of Letters Patent No. 11,269, dated July 11, 1854.

*To all whom it may concern:*

Be it known that I, HENRY PHILIP GENGEMBRE, of Allegheny City, county of Allegheny, and State of Pennsylvania, have invented a new and useful compound, to which I give the name of "Fusible Marble," which compound can serve as a substitute to carved stones, iron, slate, paving-bricks, or as cement in architectural and engineering purposes; and I do hereby declare that the following is a full and exact description thereof.

My invention consists in combining the thick portion of coal-tar, generally known as "coal-pitch" or "coal-asphaltum," whether extracted by distillation or otherwise, with aluminous clay, calcarian loam, and silex in various proportions to obtain an aluminous calcarian pitchy cement. This cement is black, solid, sonorous, susceptible of being polished, unalterable by air, water, dilute acids, or boiling-water heat. It is fusible at from 500° to 530° Fahrenheit, and when melted has the consistence of molasses. While in that state, if put in contact with sand, gravel, stones, bricks, iron, wood, &c., and allowed to cool, it is found to adhere strongly to them. It is prepared by incorporating in one hundred pounds of melted mineral pitch eighty-six pounds of aluminous clay and forty-one pounds of calcarian loam previously pulverized together, and when the mixture has boiled for some time by adding twenty-nine pounds of fine sand; but I neither claim nor restrict myself to the above proportions or mode of operating.

I claim as my invention and desire to secure by Letters Patent—

The process of preparing fusible marble by adding asphaltum or mineral pitch, aluminous clay, calcareous loam, and silex in about the following proportions, viz: aluminous clay, sixty to seventy-five per cent.; calcareous loam, from ten to twenty per cent.; pitch, from thirty to forty, and silex in quantity sufficient to give the desired hardness, the quantity of pitch to be increased or reduced according to the temperature or purposes for which the manufactured article is to be used.

H. P. GENGEMBRE.

Witnesses:
S. F. DALE,
HENRY P. SCHWARTZ.